United States Patent

[11] 3,581,707

| [72] | Inventor | Weldon R. Cook<br>30700 Manzono Drive, Malibu, Calif. 90265 |
|---|---|---|
| [21] | Appl. No. | 9,480 |
| [22] | Filed | Feb. 9, 1970 |
| [45] | Patented | June 1, 1971 |

[54] TREE HOUSE
3 Claims, 3 Drawing Figs.

[52] U.S. Cl. .................................................. 119/1
[51] Int. Cl. .................................................. A01k 29/00
[50] Field of Search ........................................ 119/1, 23, 15, 17, 19, 29; 211/78, 86; D30/99; D33/3; D80/9

[56] References Cited
UNITED STATES PATENTS

| 2,932,279 | 4/1960 | Giles ........................... | 119/19 |
| 2,997,019 | 8/1961 | Bryson ........................ | 119/1 |
| 3,017,858 | 1/1962 | Brown ......................... | 119/23 |
| 3,035,544 | 5/1962 | Katt, Jr. ...................... | 119/19 |
| 3,078,826 | 2/1963 | Bear ............................ | 119/23 |
| 3,479,990 | 11/1969 | Crow ........................... | 119/1 |
| 3,479,991 | 11/1969 | Lichtenberger .............. | 119/29 |

*Primary Examiner*—Aldrich F. Medbery
*Attorney*—Jessup and Beecher

ABSTRACT: An improved play and housing structure for cats, or other household pets, is provided. The structure includes a pedestal, an upright post extending upwardly from said pedestal, a compartment mounted about halfway up the post, and a spring-loaded mounting bracket at the top of the post for engaging the ceiling of the room in which the structure is located. The mounting bracket serves to maintain the structure firmly and rigidly between the floor and ceiling of the room, with the post in an upright position. The entire structure may be covered, for example, with carpeting to provide a scratching post for the cat, and also for the comfort of the pet. A platform may be mounted at the upper end of the post to serve as a perch.

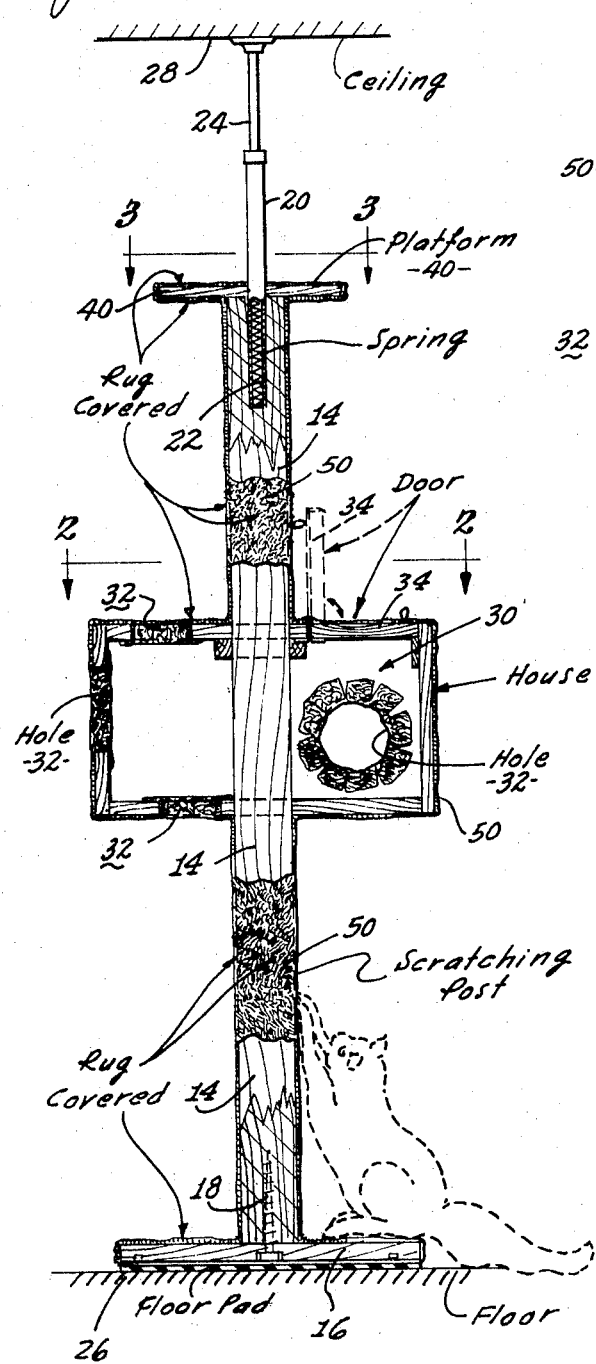
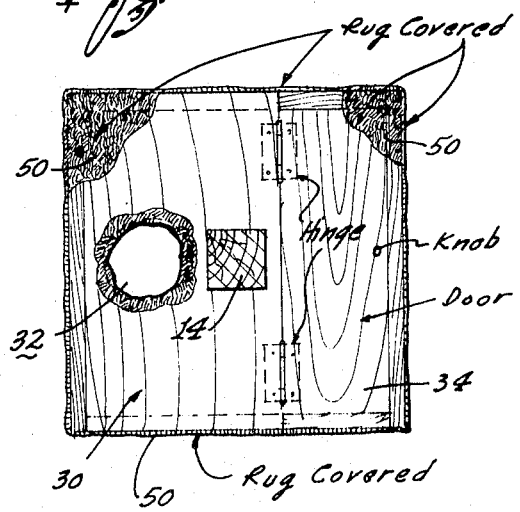
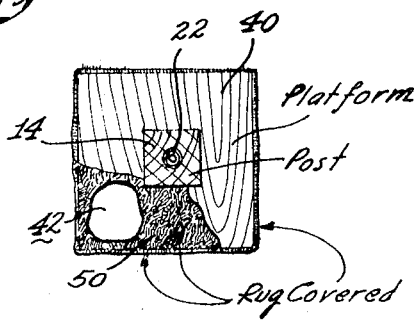

TREE HOUSE

BACKGROUND OF THE INVENTION

The structure of the invention finds particular utility in apartments, or houses in which space is restricted. The prime purpose of the structure is to provide a playground and house for a cat, or other household pet. The structure has an elongated configuration, and it extends from the floor to the ceiling of the room in which it is located. A constructed embodiment, for example, adjusts for 7 feet 8 inch—8 feet 6 inch ceilings.

The assembly includes posts and a house located on the post at a position intermediate its ends. The house may be constructed of plywood, for example, and holes may be provided in its walls so as to permit the pet to crawl in and out of the house. An upper platform may also be provided at the top of the post, as mentioned, and the platform may have a hole in it to permit the pet to crawl up the post and onto the platform. The entire structure may be covered with carpeting, as also mentioned above, so as to provide a scratching post for the pet, and also for the comfort of the pet.

A feature of the structure of the invention is its tremendous appeal to cats, in that it provides holes for the animal to crawl through, a shelter for the animal, and heights to climb, all encased, for example, in soft carpeting. The structure is relatively inexpensive, and it is easy to install. The structure itself, when installed, is rigid and stable and has no tendency to fall over, or to be pulled over by the pet.

BRIEF DESCRIPTION OF THE DRAWING

FIG. 1 is a side elevation, partly in section, and showing the structure in accordance with one embodiment of the invention;

FIG. 2 is a view of the structure taken along the line 2–2 of FIG. 1, and showing particularly details of the top of a housing which is incorporated into the structure; and FIG. 3 is another view taken along the line 3–3 and showing the details of a platform which is mounted near the top of the structure.

DETAILED DESCRIPTION OF THE ILLUSTRATED EMBODIMENT

The improved structure of the present invention simulates a tree house, and has particular attractiveness for cats, and similar household pets. The structure illustrated in the drawing includes, for example, a post 14 which may be composed, for example, of wood, or other appropriate material, and which may be of 4 inch by 4 inch transverse dimensions, and of the order of 7 feet tall. A pedestal 16 is mounted on the lower end of the post 14 by means, for example, of a screw 18. A spring-loaded bracket 20 is mounted at the upper end of the post in axial alignment with the longitudinal axis of the post. The spring-loaded bracket 20 includes, for example, a spring 22 and a rod 24.

The spring 22 biases the rod 24, so that when the structure is mounted in a room, the post 14 is rigidly held in an upright position with the pedestal 16 firmly engaging the floor 26, and with the upper end of the rod 24 firmly engaging the ceiling 28 of the room in which the structure is located. The spring-loaded bracket 20 holds the structure rigidly and firmly in an upright position, so that there is no tendency for the structure to fall down, or to be pulled down by the pet.

A house 30 is mounted on the post 14 about halfway between its ends. The house 30 may be composed, for example, of plywood, and it may have a rectangular configuration, as shown. A plurality of holes 32 are provided in the walls of the house 30, and also in the bottom, if so desired, so as to permit the pet to crawl up the post and in and out of the house. A door 34 may be provided in the top of the house 30, if the customer so desires.

A platform 40 is mounted on the upper end of the post 14, and this platform may serve as a perch for the pet, permitting the pet to crawl up the post 14 and onto the platform. A hole 42 FIG. 3 may be provided in the platform to facilitate the animal's ascent onto the platform. The platform 40 may, like the house 30, be composed of plywood. However, other appropriate materials may be used.

The entire structure may be covered with carpeting 50, so that the post 14 may serve as a scratching post for the pet, and also to assist the pet and make it easy for it to climb up and down the structure. The rug or carpeting also serves to enhance the comfort of the house 30 and the structure, insofar as the pet is concerned.

The invention provides, therefore, a unique and improved structure which serves as a playground and house for a household pet, such as a cat. The structure, as mentioned above, has tremendous appeal to cats, and similar household pets, and also provides a sleeping compartment for the pet.

It will be appreciated that although one embodiment of the invention has been shown and described, modifications may be made. The following claims are intended to cover all such modifications which come within the spirit and scope of the invention.

What I claim is:

1. A structure for cats, and other household pets, comprising: a post; spring-loaded bracket means mounted at the top of said post and including an elongated bracket member axially aligned with the longitudinal axis of said post and spring biased to engage the ceiling of the room in which the structure is located and serving to hold the post in an upright position on the floor of the room; a house mounted on said post between the ends of said post, said housing having sidewalls and top and bottom walls defining a particular shape, and said walls having apertures therein to permit the pets to crawl in and out of the house; and carpeting surrounding said post and the interior and exterior of said house.

2. The structure defined in claim 1, and which includes a lower pedestal which engages the floor and which is secured to the lower end of said post.

3. The structure defined in claim 1, and which includes a platform secured to the upper end of said post.